(12) United States Patent
Vega et al.

(10) Patent No.: US 11,732,905 B2
(45) Date of Patent: *Aug. 22, 2023

(54) HEAT PUMP WATER HEATER SYSTEMS AND METHODS THERETO

(71) Applicant: Rheem Manufacturing Company, Atlanta, GA (US)

(72) Inventors: David I. Vega, Atlanta, GA (US); Raheel A. Chaudhry, Atlanta, GA (US); Troy E. Trant, Atlanta, GA (US); Piyush Porwal, Atlanta, GA (US)

(73) Assignee: Rheem Manufacturing Company, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/812,238

(22) Filed: Jul. 13, 2022

(65) Prior Publication Data

US 2022/0341600 A1   Oct. 27, 2022

Related U.S. Application Data

(63) Continuation of application No. 17/104,006, filed on Nov. 25, 2020, now Pat. No. 11,415,327.

(51) Int. Cl.
*F24D 19/10* (2006.01)
*F24D 11/02* (2006.01)
(Continued)

(52) U.S. Cl.
CPC ...... *F24D 19/1069* (2013.01); *F24D 11/0228* (2013.01); *F24D 19/1054* (2013.01);
(Continued)

(58) Field of Classification Search
CPC ............ F24D 19/1054; F24D 19/1063; F24D 19/1069; F24D 11/0228; F24D 11/0214;
(Continued)

(56) References Cited

U.S. PATENT DOCUMENTS

| | | |
|---|---|---|
| 4,540,874 A | 9/1985 | Shaffer, Jr. et al. |
| 4,550,770 A | 11/1985 | Nussdorfer et al. |

(Continued)

FOREIGN PATENT DOCUMENTS

| | | |
|---|---|---|
| EP | 2397778 A1 | 12/2011 |
| JP | 2001255013 A | 9/2001 |

(Continued)

OTHER PUBLICATIONS

International Search Report and Written Opinion issued in corresponding international application No. PCT/US2021/060246 dated Mar. 3, 2022.

*Primary Examiner* — Steven B McAllister
*Assistant Examiner* — Daniel E. Namay
(74) *Attorney, Agent, or Firm* — Eversheds Sutherland (US) LLP

(57) ABSTRACT

A fluid heating device comprising a heat pump and an electric heating element can include a system and method that can receive current data from a current sensor and temperature data from a temperature sensor, determine whether the current is greater than or equal to a threshold current and whether the temperature is greater than or equal to a threshold temperature, and output a control signal to heat the fluid using the heat pump only or the electric heating element only based on the current data and the temperature data.

19 Claims, 4 Drawing Sheets

(51) Int. Cl.
*F24H 4/04* (2006.01)
*F24H 9/20* (2022.01)
*F24H 1/20* (2022.01)

(52) U.S. Cl.
CPC ............... *F24H 1/202* (2013.01); *F24H 4/04* (2013.01); *F24H 9/2021* (2013.01); F24D 2200/32 (2013.01); F25B 2700/15 (2013.01)

(58) Field of Classification Search
CPC ...... F24D 11/02; F24D 17/02; F24D 2200/32; G05D 23/19; F24H 4/04; F24H 1/202; F24H 1/20; F24H 9/2021; F25B 13/00; Y02B 30/12
USPC ........ 392/441–464; 62/238.6, 238.7; 122/4 a
See application file for complete search history.

(56) References Cited

U.S. PATENT DOCUMENTS

| 5,367,602 | A | 11/1994 | Stewart |
| 8,422,870 | B2 | 4/2013 | Nelson et al. |
| 8,887,672 | B2 | 11/2014 | Junge et al. |
| 10,458,678 | B2 | 10/2019 | Trant et al. |
| 2012/0067074 | A1 | 3/2012 | Lesage et al. |
| 2013/0047640 | A1 | 2/2013 | Nelson et al. |
| 2019/0145634 | A1 | 5/2019 | Chaudhry |

FOREIGN PATENT DOCUMENTS

| RU | 156820 U1 | 11/2015 |
| WO | 2011023193 A2 | 3/2011 |
| WO | 2015140683 A1 | 9/2015 |

HEAT PUMP WATER HEATER SYSTEMS AND METHODS THERETO

CROSS-REFERENCE TO RELATED APPLICATIONS

The present application claims priority to, the benefit of, and is a continuation application of U.S. application Ser. No. 17/104,006, filed Nov. 25, 2020, which is hereby incorporated by reference herein in its entirety.

FIELD OF TECHNOLOGY

The disclosed technology relates generally to systems and methods for heating water with a water heating system that includes a heat pump and an electric heating element.

BACKGROUND

Heat pump water heaters are commonly used in residential and commercial applications to heat water for various uses. Heat pumps are capable of heating water stored in a storage tank by utilizing the vapor-compression cycle of a refrigerant to transfer thermal energy to the water in the storage tank. By utilizing the vapor compression cycle, heat pump water heaters are capable of heating water in an efficient manner.

Even though a heat pump is typically more energy efficient than gas burners or electric heating elements commonly used in water heaters, heat pump water heaters tend to require longer heating times to bring a temperature of water in the storage tank up to a predetermined temperature. One way to speed up the heating process of a heat pump water heater is to use a larger compressor in the heat pump. Unfortunately, larger compressors require greater electrical current and can exceed the ampacity rating of the electrical circuit in which the compressor is installed. This can be particularly troublesome in residential applications where the typical household is wired with a 120-volt circuit that has a maximum current rating of 15 amps or 20 amps. This limitation on current means that most heat pump water heaters require either long heating times or a special, dedicated circuit that can accommodate the current required by a larger compressor.

To decrease the amount of time it takes to heat the water using a heat pump, some water heating systems include a heating element that can be turned on simultaneously with the heat pump to heat the water. This configuration, however, causes the water heater to draw more current when both the heat pump and the electric heating element are operated simultaneously. When both the electric heating element and heat pump operate simultaneously, the capacity of the heat pump is limited because some of the current in the circuit must be dedicated to the electric heating element.

Heat pumps are also known to operate less efficiently as the temperature of the water in the water heater nears an upper temperature limit or when the ambient temperature rises above a threshold temperature. This is, in part, because heat pumps must work harder to add heat to the water as the water temperature rises and, as the ambient temperature rises, the components of the heat pump become less efficient and can overheat leading to damage of the heat pump. The negative effects of high ambient temperature on a heat pump can be a common problem if the heat pump is installed in an attic or other unventilated spaces where high temperatures are observed during the summer months.

What is needed, therefore, is a system and method of efficiently operating a heat pump water heater without exceeding the current limitations of the electrical circuit.

These and other problems are addressed by the technology disclosed herein.

SUMMARY

The disclosed technology relates generally to systems and methods for heating water with a water heating system that includes a heat pump and an electric heating element. The disclosed technology can include a fluid heating device having a heating chamber that can hold a fluid, a heat pump that can heat the fluid in the heating chamber, and an electric heating element that can heat the fluid. The fluid heating device can have a temperature sensor that can detect a temperature of the fluid and output the fluid temperature data. The fluid heating device can have a current sensor that can detect a current drawn by at least a portion of the fluid heating device and output the current data.

The fluid heating device can have a controller that can receive the fluid temperature data from the temperature sensor and the current data from the current sensor. In response to determining, based at least in part on the fluid temperature data and the current data, that the temperature of the fluid is less than a threshold temperature and that the current is less than a threshold current, the controller can output a control signal to heat the fluid with the heat pump (e.g., with the heat pump only). In response to determining, based at least in part on the fluid temperature data and the current data, that the temperature of the fluid is less than the threshold temperature and that the current is greater than or equal to the threshold current, the controller can output a control signal to heat the fluid with the electric heating element (e.g., with the electric heating element only).

In some examples, the threshold temperature can be a first threshold temperature. In response to determining, based at least in part on the fluid temperature data and the current data, that the temperature of the fluid is greater than or equal to a second threshold temperature and less than the first threshold temperature, the controller can output a control signal to heat the fluid with the electric heating element (e.g., with the electric heating element only). The first threshold temperature can be greater than the second threshold temperature.

In some examples, the fluid heating device can include an ambient temperature sensor that can detect an ambient temperature of ambient air proximate the fluid heating device and output ambient temperature data. The controller can receive the ambient temperature data from the ambient temperature sensor. In this example, outputting the control signal to heat the fluid with the heat pump can be in response to determining, based at least in part on the ambient temperature data, that the ambient temperature is less than a threshold ambient temperature.

In some examples, in response to determining, based at least in part on the ambient temperature data, that the ambient temperature is greater than or equal to the threshold ambient temperature, the controller can output a control signal to heat the fluid with the electric heating element (e.g., with the electric heating element only). In other examples, in response to determining, based at least in part on the ambient temperature data, that the ambient temperature is less than a threshold ambient temperature, the controller can output a control signal to heat the fluid with the heat pump (e.g., with the heat pump only).

The disclosed technology can also include a method of controlling a water heater system comprising a heat pump and an electric heating element. The method can include receiving, from a temperature sensor, temperature data indicative of a temperature of water in the water heater. The method can also include receiving, from a current sensor, current data indicative of a current delivered to the heat pump of the water heater system. In response to determining, based at least in part on the temperature data and the current data, that the temperature of the water is less than a threshold temperature and that the current is less than a threshold current, the method can include outputting a control signal to heat the water with the heat pump (e.g. with the heat pump only). Alternatively, or in addition, in response to determining, based at least in part on the temperature data and the current data, that the temperature of the water is less than the threshold temperature and that the current is greater than or equal to the threshold current, the method can include outputting a control signal to heat the water with the electric heating element (e.g., the electric heating element only).

In some examples, the threshold temperature can be a first threshold temperature. In response to determining, based at least in part on the temperature data and the current data, that the temperature of the water is greater than or equal to a second threshold temperature and less than the first threshold temperature, the method can include outputting a control signal to heat the water with the electric heating element (e.g., with the electric heating element only). In this example, the first threshold temperature can be greater than the second threshold temperature.

In some examples, the method can include receiving, from an ambient temperature sensor, ambient temperature data indicative of an ambient temperature of ambient air proximate the water heater. In response to determining, based at least in part on the ambient temperature data, that the ambient temperature of the ambient air is less than a threshold ambient temperature, the method can include outputting a control signal to heat the water with the heat pump (e.g. with the heat pump only). In response to determining, based at least in part on the ambient temperature data, that the ambient temperature of the ambient air is greater than or equal to the threshold ambient temperature, the method can include outputting a control signal to heat the water with an electric heating element (e.g., the electric heating element only).

The method can also include receiving, from an ambient temperature sensor, ambient temperature data indicative of an ambient temperature of ambient air proximate the water heater. In response to determining, based at least in part on the ambient temperature data, that the ambient temperature of the ambient air is less than a threshold ambient temperature, the method can include outputting a control signal to heat the water with the heat pump (e.g., the heat pump only). In response to determining, based at least in part on the ambient temperature data, that the ambient temperature of the ambient air is greater than or equal to the threshold ambient temperature, the method can include outputting a control signal to heat the water with an electric heating element (e.g., the electric heating element only).

The disclosed technology can also include a method of controlling a water heater system comprising a heat pump and an electric heating element. The method can include receiving, from a temperature sensor, temperature data indicative of a temperature of water in the water heater system. In response to determining, based at least in part on the temperature data, that the temperature of the water is less than a maximum temperature and less than a threshold temperature, the method can include outputting a control signal to heat the water with the heat pump (e.g., with the heat pump only). In response to determining, based at least in part on the temperature data, that the temperature of the water is less than the maximum temperature and greater than or equal to the threshold temperature, the method can include outputting a control signal to heat the water with the electric heating element (e.g., the electric heating element only). The maximum temperature can be greater than the threshold temperature.

The method can also include receiving, from an ambient temperature sensor, ambient temperature data indicative of an ambient temperature of ambient air. In response to determining, based at least in part on the ambient temperature data, that the ambient temperature of the ambient air is less than a threshold ambient temperature, the method can include outputting a control signal to heat the water with the heat pump (e.g., with the heat pump only). In response to determining, based at least in part on the ambient temperature data, that the ambient temperature of the ambient air is greater than or equal to the threshold ambient temperature, the method can include outputting a control signal to heat the water with an electric heating element (e.g., the electric heating element only).

The method can include receiving, from a current sensor, current data indicative of a current delivered to the heat pump of the water heater system. In response to determining, based at least in part on the current data, that the current is less than a threshold current, the method can include outputting a control signal to heat the water with the heat pump (e.g., with the heat pump only). In response to determining, based at least in part on the current data, that the current is greater than or equal to the threshold current, the method can include outputting a control signal to heat the water with the electric heating element (e.g., the electric heating element only).

In some examples, the method can include receiving, from a current sensor, current data indicative of a current delivered to the heat pump of the water heater system. In response to determining, based at least in part on the current data, that the current is less than a threshold current, the method can include outputting a control signal to heat the water with the heat pump (e.g., with the heat pump only). In response to determining, based at least in part on the current data, that the current is greater than or equal to the threshold current, the method can include outputting a control signal to heat the water with the electric heating element (e.g., the electric heating element only).

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
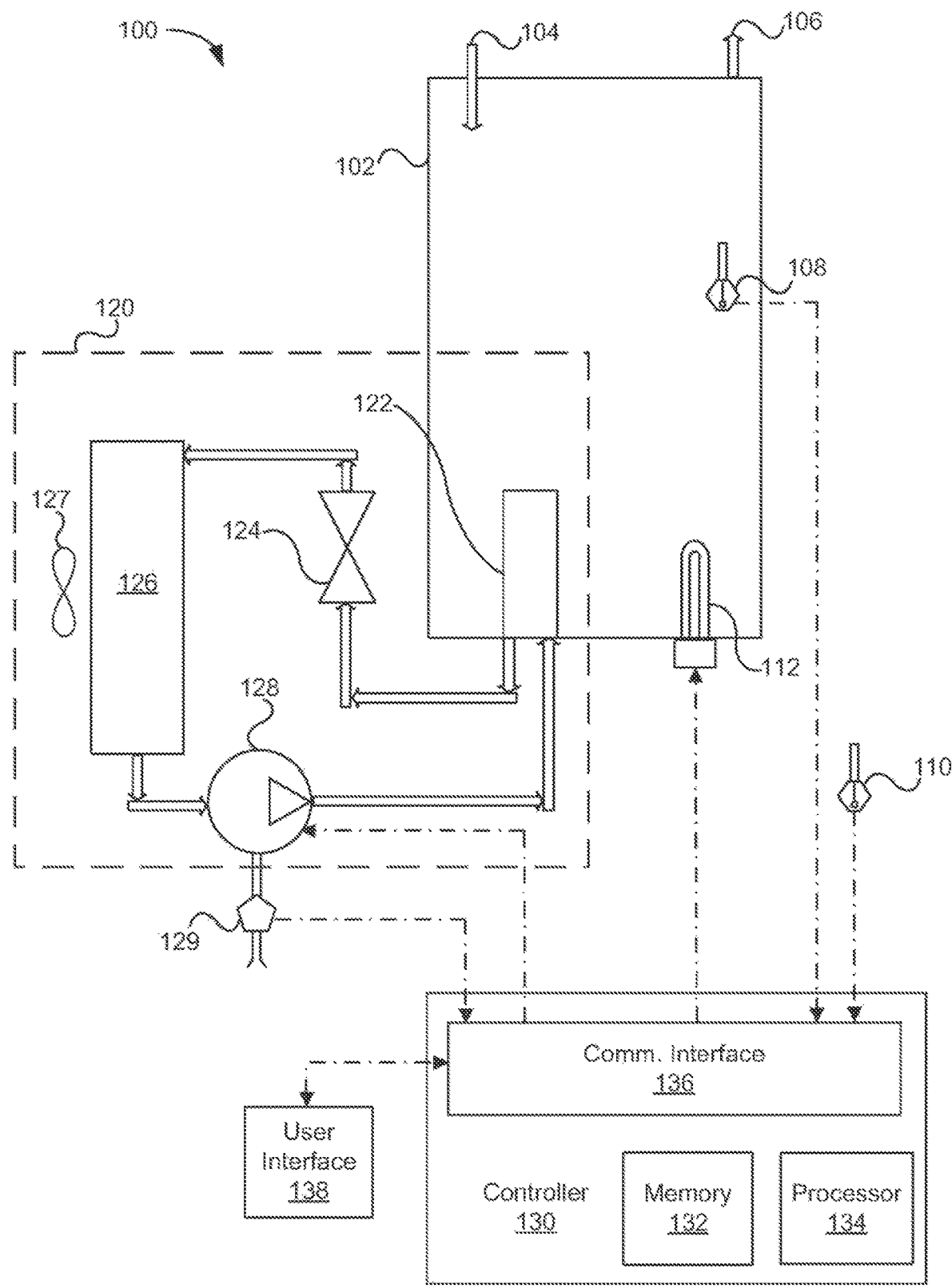
FIG. 1 illustrates an example heat pump water heater system, in accordance with the disclosed technology.

The disclosed technology relates generally to systems and methods for heating water with a water heating system that includes a heat pump and an electric heating element. The heat pump and the electric heating element can be controlled by a controller that is configured to receive water temperature data indicative of the temperature of water in the water heater, ambient temperature data indicative of the temperature of ambient air near the water heater, and current data indicative of the electrical current being used by the water heater. As described more fully herein, the controller can determine, based at least in part on the water temperature data, the ambient temperature data, and/or the current data, whether to use the heat pump or the electric heating element to heat the water. For example, the controller can determine to heat the water using the heat pump when the current in the circuit is less than a threshold current or the electric heating element when the current in the circuit is greater than or equal to the threshold current. As will become apparent throughout this disclosure, the disclosed technology includes various methods of controlling the heat pump and the electric heating element to heat the water.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways. In particular, the presently disclosed subject matter is described in the context of being a system and method for heating water with a heat pump water heater having an electric heating element. The present disclosure, however, is not so limited, and can be applicable in other contexts. The present disclosure, for example and not limitation, can include other water heater systems such as boilers, pool heaters, industrial water heaters, and other water heater systems configured to heat water. Furthermore, the present disclosure can include other fluid heating systems configured to heat a fluid other than water such as process fluid heaters used in industrial applications. Such implementations and applications are contemplated within the scope of the present disclosure. Accordingly, when the present disclosure is described in the context of being a system and method for heating water with a heat pump water heater having an electric heating element, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Although the term "water" is used throughout this specification, it is to be understood that other fluids may take the place of the term "water" as used herein. Therefore, although described as a water heater system, it is to be understood that the system and methods described herein can apply to fluids other than water. Further, it is also to be understood that the term "water" can replace the term "fluid" as used herein unless the context clearly dictates otherwise.

Referring now to the drawings, in which like numerals represent like elements, examples of the present disclosure are herein described. FIG. 1 illustrates an example water heater system 100, in accordance with the disclosed technology. The water heater system 100 can include a heating chamber 102 having a fluid inlet 104 and a fluid outlet 106. The heating chamber 102 can be configured to receive water or other fluids through the fluid inlet 104 and direct the water toward the fluid outlet 106. An electric heating element 112 and a heat pump 120 can be in communication with a controller 130 and be configured to provide heat to the water flowing through the heating chamber 102.

The heating chamber 102 can be sized for various applications. For example, the heating chamber 102 can be sized for common residential uses or for commercial or industrial uses that require greater amounts of heated water. Furthermore, the heating chamber 102 can be made of any suitable material for storing and heating water, including copper, carbon steel, stainless steel, ceramics, polymers, composites, or any other suitable material. The heating chamber 102 can also be treated or lined with a coating to prevent corrosion and leakage. A suitable treating or coating will be capable of withstanding the temperature and pressure of the system and can include, as non-limiting examples, glass enameling, galvanizing, thermosetting resin-bonded lining materials, thermoplastic coating materials, cement coating, or any other suitable treating or coating for the application. Optionally, the heating chamber 102 can be insulated to retain heat. For example, the heating chamber 102 can also be insulated using fiberglass, aluminum foil, organic material, or any other suitable insulation material.

The water heater system 100 can have at least one water temperature sensor 108 configured to detect a temperature of the water in the system. The water temperature sensor 108 can be located or positioned to detect a temperature of the water in the system at various locations such as upstream of the heating chamber 102, inside of the heating chamber 102, downstream of the heating chamber 102, or any other suitable location in the system 100 where the temperature of the water can be detected. The water temperature sensor 108 can each be configured to output temperature data and be in communication with a controller 130. As will be described in greater detail herein, the temperature data provided by the water temperature sensor 108 can be used by the controller 130 to determine actions based on current system conditions.

The water heater system 100 can include an ambient temperature sensor 110 configured to detect a temperature of the ambient air proximate the water heater system 100 and output temperature data to the controller 130. As will be appreciated, the ambient temperature sensor 110 can be installed in various locations proximate the water heater system 100 such that the ambient temperature sensor 110 can detect and/or measure a temperature of the ambient air proximate the water heater system 100 and output data corresponding to the detected temperature of the ambient air. For example, the ambient temperature sensor 110 can be mounted on or in the water heater system 100, or the ambient temperature sensor 110 can be placed in another location near the water heater system 100.

The water temperature sensor 108 and the ambient temperature sensor can be any type of temperature sensor capable of measuring the temperature of a fluid (e.g., water in the water heater system 100 or ambient air proximate the water heater system 100) and providing temperature data indicative of the fluid temperature to the controller 130. For example, the water temperature sensor 108 and the ambient temperature sensor 110 can be thermocouples, resistor temperature detectors, thermistors, infrared sensors, semiconductors, or any other type of sensor which would be appropriate for a given use or application. All temperature sensors of the system can be the same type of temperature sensor, or the system 100 can include different types of temperature sensors. For example, water temperature sensor 108 can be a thermocouple while the ambient temperature sensor 110 can be a thermistor. One skilled in the art will appreciate that the type, location, and number of temperature sensors can vary depending on the application.

The system 100 can include one or more electric heating elements 112 configured to provide heat to the fluid in the system 100. The electric heating element(s) 112 can be located anywhere in the system 100 where the electric heating element 112 can provide heat to the fluid in the system 100. For example, the electric heating element(s) 112 can be located upstream of the heating chamber 102, inside of the heating chamber 102, or downstream of the heating chamber 102. In systems 100 having more than one heating element 112, as another example, one or more heating element(s) 112 can be located proximate the bottom of the heating chamber 102 while one or more other heating element(s) 112 can be located proximate the top of the heating chamber 102, or other locations in the system 100. If located outside of the heating chamber 102, the electric heating element(s) 112 can be located proximate the heating chamber 102 (i.e., in the same housing as the heating chamber 102, in the same general location as the heating chamber 102 and/or in the same room of a building as the heating chamber 102). The electric heating element(s) 112 can be configured to be controlled by the controller 130 based on a control signal output by the controller 130. The electric heating element 112 can be modulated by the controller 130 to vary the output of the electric heating element 112. For example, the controller 130 can output a control signal to modulate the electric heating element 112 to operate at anywhere between 0% to 100% of the electric heating element's 112 heat output capacity.

The electric heating element 112 can include any form of resistive heating element suitable for the application. For example, the electric heating element 112 can be made with a Nichrome (NiCr) resistive element surrounded by an insulating material and encased in a casing. The resistive element can be made from Nichrome, Kanthal™, Constantan, Manganin™, Balco™ or any other suitable material. The insulating material can be made from insulating material such as Magnesium Oxide, glass, porcelain, composite polymer materials, clay, quarts, alumina, feldspar, or any other suitable insulating material. The casing can be made from a metal (e.g., titanium, stainless steel, nichrome, Kanthal™, cupronickel, etched foil, and the like.), a ceramic (e.g., molybdenum disilicide, silicon carbide, PTC ceramic, and the like.), thick film, or a polymer PTC heating element. Furthermore, the casing can be treated or coated to help prevent corrosion and elongate the life of the element. For example, the system 100 can include an electric heating element 112 with a casing made of copper and treated with a nickel plating. Alternatively or in addition, the electric heating element 112 can include a copper tubing casing coated with magnesium oxide and zinc plating. Alternatively or in addition, the electric heating element 112 can include a titanium or stainless-steel casing that is coated with an appropriate coating, if desired. One of skill in the art will understand that the exact materials and configuration of the electric heating element 112 can vary depending on the particular application.

As depicted in FIG. 1, the disclosed technology can include a heat pump 120 to heat the fluid in the heating chamber 102. The heat pump 120 can be any suitable form of heat pump that can be used to heat water, including compression- or absorption-type heat pumps. The heat pump 120 can be adapted to use an air source, ground source, water source, or any other heat source. The heat pump 120 can also be a geothermal, air-to-water, water-to-water, liquid-to-water, or any other type of heat pump system that is appropriate for the particular application. As an example, the heat pump 120 can be an air source type heat pump, which utilizes a refrigerant in a vapor-compression cycle, but the type of heat source can be modified depending on the particular application. The heat pump 120 can be a single-stage, two-stage, or variable capacity heat pump, depending on the application. Furthermore, one or more components of the heat pump 120 can be in communication with the controller 130. For example, the expansion valve 124 and the compressor 128 can be configured to receive control signals from, or otherwise be operated by, the controller 130.

The heat pump 120 can include a condenser 122, an expansion valve 124, an evaporator 126, and a compressor 128. The various components can be sized, shaped, and located as would be suitable for the particular application. As will be appreciated, the various components of the heat pump 120 can be sized for residential, commercial, or industrial applications and for heating water within various temperature ranges and within various time ranges. As a non-limiting example, the heat pump 120 can be configured to heat water to 140° F. within less than thirty minutes, within less than one hour, approximately one hour, approximately between one hour and one and a half hours, or greater amounts of time for residential applications. On the other hand, the heat pump 120 can be configured to heat the water to higher temperatures within longer or shorter time frames for commercial or industrial applications.

The compressor 128 can be any type of compressor. For example, the compressor 128 can be a positive displacement compressor, a reciprocating compressor, a rotary screw compressor, a rotary vane compressor, a rolling piston compressor, a scroll compressor, an inverter compressor, a diaphragm compressor, a dynamic compressor, an axial compressor, or any other form of compressor that can be integrated into the heat pump 120 for the particular application. Furthermore, as will be described in greater detail herein, the system 100 can be configured with a compressor 128 having a higher capacity than would normally be installed in a given water heater system 100 having a given electrical circuit because the controller 130 can be configured to ensure the compressor 128 does not exceed the ampacity limitations for the given electrical circuit. As an example, the compressor 128 can have a capacity of greater than 5,000 Btu/hr for a 120 volt circuit. Thus, by incorporating a compressor 128 having a higher-than-normal capacity, the heat pump 120 can be configured to heat the water to a desired temperature faster than compressors 128 having lower capacities. Alternatively, or in addition, the system 100 can include more than one compressor 128. For example, the system 100 can include multiple compressors 128 having individual capacities of less than or equal to 5,000 Btu/hr that together have a combined capacity of greater than 5,000 Btu/hr for a 120 volt circuit. As another example, the system 100 can include multiple compressors 128 having individual capacities of greater than 5,000 Btu/hr for a 120 volt circuit. As will be appreciated by one of skill in the art, the disclosed technology can be used to heat water in the water heater system 100 using a compressor 128, or multiple compressors 128, having a greater capacity (or combined capacity) than would normally be used for the given circuit of the water heater system 100.

The condenser 122 can be sized, shaped, and installed in a position that improves energy transfer to the water in the heating chamber 102. For example, the condenser 122 can be sized and positioned near the bottom, middle, or top of the inside of the heating chamber 102 to ensure heat is transferred to the water in the heating chamber 102 efficiently as would be suitable for the particular application. On the other hand, the evaporator 126 can be located where it can absorb heat from the ambient air or other heat sources. The evaporator 126, for example, can be installed in an enclosure the system 100 or in a separate location so long as the evaporator 126 is in fluid communication with other components of the heat pump 120. The evaporator can include any heat source, such as air, water, or geothermal sources. Both the condenser 122 and the evaporator 126 can be made of material(s) that can effectively exchange heat, including copper, aluminum, stainless steel, gold, silver, gallium, indium, thallium, graphite, composite materials, or any other material that is suitable for the particular application. Furthermore, the heat pump 120 can include more than one evaporator 126 and more than one condenser 122 to help increase heat transfer as would be suitable for the particular application.

The expansion valve 124 can be any type of expansion valve. For example, the expansion valve 124 can be a thermal expansion valve, a manual expansion valve, an automatic expansion valve, an electronic expansion valve, a low-pressure float valve, a high-pressure float valve, capillary tubes, or any other form of expansion valve appropriate for the application. The size, type, and installed location of the expansion valve 124 can vary depending on the application, which can be influenced by the above system requirements or other considerations.

The heat pump 120 can include a ventilation system 127, that can be used to cool certain components of the heat pump 120. The ventilation system 127 can be configured to operate continuously, only while the heat pump 120 is operating, only while a temperature proximate the heat pump 120 is greater than or equal to a threshold temperature, or any combination thereof. The ventilation system 127 can be controlled by the controller 130 based on temperature data received, for example, from the ambient temperature sensor 110. Furthermore, the ventilation system 127 can be an active ventilation system, such as a mechanical fan or blower, or a passive venting system, such as a vent or louver.

The system 100 can include a current sensor 129 configured to detect and measure the amperage (or current flow) of an electrical current delivered to components of the system 100. For example, the current sensor 129 can be configured to detect a current delivered to at least the compressor 128. The current sensor 129 can be any type of current sensing device including both direct and indirect current measuring devices. For example, the current sensor 129 can be a shunt resistor device where the current is determined by measuring a voltage drop across the shunt resistor. In other examples, the current sensor 129 can be a current transformer, Rogowski coil, Hall effect sensor, Fluxgate sensor, magneto-resistive current sensor, or any other suitable type of current sensor for the application. As will be appreciated, the controller 130 can be in communication with the current sensor 129 and determine the amount of current detected by the current sensor 129. As will be described in greater detail herein, the controller 130 can be configured to determine, based at least in part on the data received from the current sensor 129, whether to control the heat pump 120 or the electric heating element 112.

The controller 130 can have a memory 132, a processor 134, and a communication interface 136. The controller 130 can be a computing device configured to receive data, determine actions based on the received data, and output a control signal instructing one or more components of the system 100 to perform one or more actions. One of skill in the art will appreciate that the controller 130 can be installed in any location, provided the controller 130 is in communication with at least some of the components of the system. Furthermore, the controller 130 can be configured to send and receive wireless or wired signals and the signals can be analog or digital signals. The wireless signals can include Bluetooth™, BLE, WiFi™, ZigBee™, infrared, microwave radio, or any other type of wireless communication as may be suitable for the particular application. The hard-wired signal can include any directly wired connection between the controller and the other components. For example, the controller 130 can have a hard-wired 24 VDC connection to the water temperature sensor 108. Alternatively, the components can be powered directly from a power source and receive control instructions from the controller 130 via a digital connection. The digital connection can include a connection such as an Ethernet or a serial connection and can utilize any suitable communication protocol for the application such as Modbus, fieldbus, PROFIBUS, SafetyBus p, Ethernet/IP, or any other suitable communication protocol for the application. Furthermore, the controller 130 can utilize a combination of wireless, hard-wired, and analog or digital communication signals to communicate with and control the various components. One of skill in the art will appreciate that the above configurations are given merely as non-limiting examples and the actual configuration can vary depending on the particular application.

The controller 130 can include a memory 132 that can store a program and/or instructions associated with the functions and methods described herein and can include one or more processors 134 configured to execute the program and/or instructions. The memory 132 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques or methods described herein can be implemented as a combination of executable instructions and data within the memory.

The controller 130 can also have a communication interface 136 for sending and receiving communication signals between the various components. Communication interface 136 can include hardware, firmware, and/or software that allows the processor(s) 134 to communicate with the other components via wired or wireless networks, whether local or wide area, private or public, as known in the art. Communication interface 136 can also provide access to a cellular network, the Internet, a local area network, or another wide-area network as suitable for the particular application.

Additionally, the controller 130 can have or be in communication with a user interface 138 for displaying system information and receiving inputs from a user. The user interface 138 can be installed locally on the system 100 or be a remotely controlled device such as a mobile device. The user, for example, can view system data on the user interface 138 and input data or commands to the controller 130 via the user interface 138. For example, the user can view threshold settings on the user interface 138 and provide inputs to the controller 130 via the user interface 138 to change a threshold setting.

The controller 130 can be configured to determine whether to use the electric heating element 112 or the heat pump 120 based at least in part on data received from the water temperature sensor 108, the ambient temperature sensor 110, and/or the current sensor 129. For example, the controller 130 can configured to control the system 100 in accordance with one or more of the example methods described in relation to FIG. 2, FIG. 3, and FIG. 4.

Although not depicted in FIG. 1, the water heater system 100 can be configured to include additional sensors configured to detect various system parameters and output data to the controller 130. The controller 130 can be further configured to receive the data from the various sensors and control an output of the heat pump 120 and the electric heating element 112 based on the data received from the various sensors. For example, the water heater system 100 can include temperature and pressure sensors configured to detect a temperature and pressure of the refrigerant in the heat pump 120 such as suction temperature and pressure, liquid temperature and pressure, and discharge temperature and pressure. Furthermore, the water heater system 100 can include a humidity sensor configured to detect a relative humidity of the ambient air proximate the water heater system 100. The controller 130 can be configured to receive data from these various sensors and determine, based on the data, whether the heat pump would 120 or the electric heating element would be more efficient to operate to heat the water in the water heater system 100.

Figure 2:
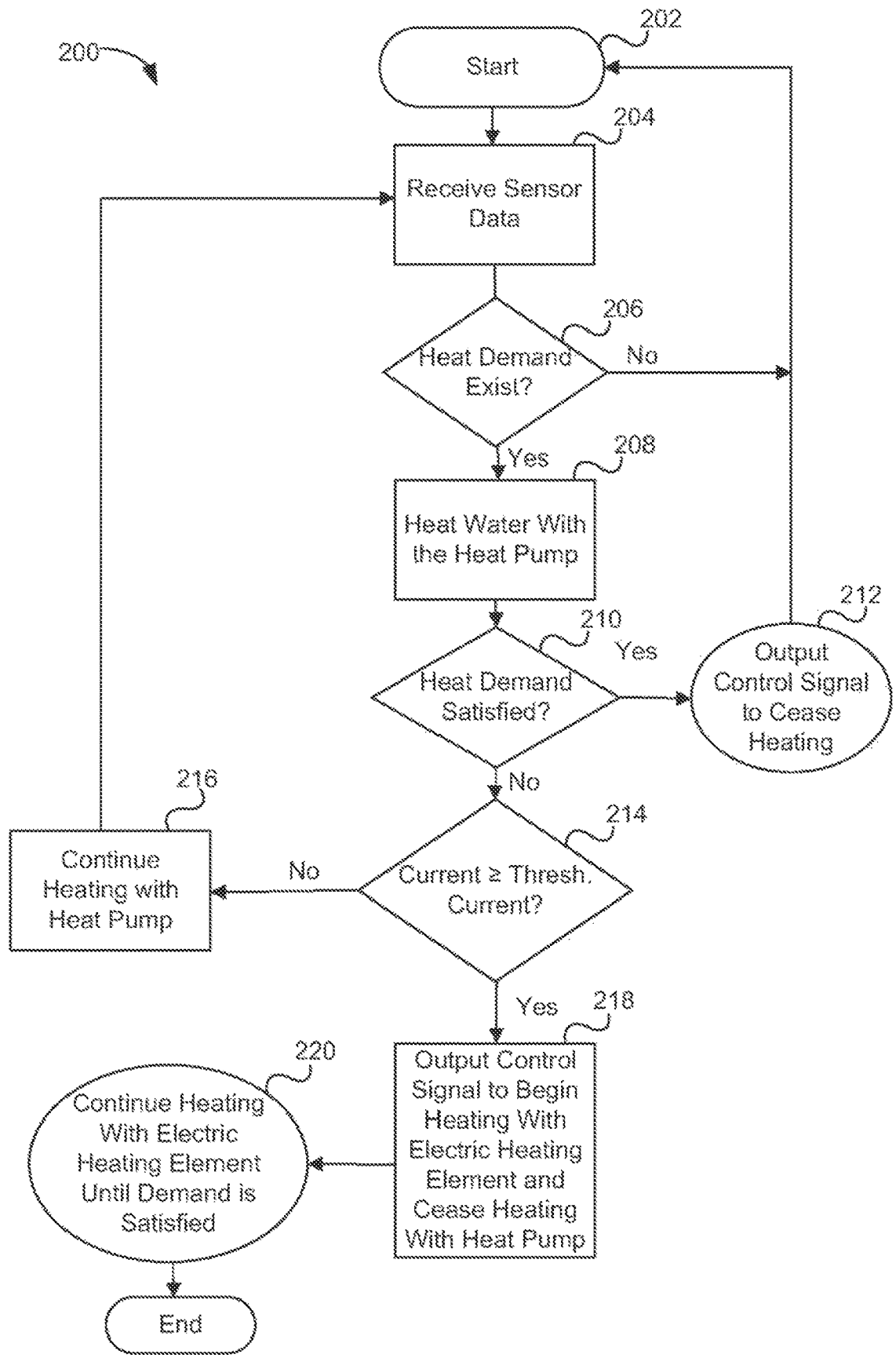
FIG. 2 is a logic diagram illustrating an example method of heating water using a heat pump and an electric heating element, in accordance with the disclosed technology.

FIG. 2 is a logic diagram illustrating an example method 200 of heating water using a heat pump 120 and an electric heating element 112, in accordance with the disclosed technology. The method 200 of operating the water heater system 100 can include starting 202 a logic sequence by receiving a start signal or by initiating the method 200 (e.g., as power is received to the controller 130). The method 200 can include receiving 204 sensor data from various sensors in the water heater system 100. For example, the controller 130 can be configured to receive temperature data from the water temperature sensor 108 and/or the ambient temperature sensor 110 and/or current data from the current sensor 129. The method 200 can include determining 206 whether a heat demand exists (e.g., whether there is a need to heat the water in the heating chamber 102 to maintain the temperature of the water at a target set temperature). Determining 204 whether a heat demand exists can include at least one of receiving an input from a user, determining that the temperature of the water in the heating chamber 102 is less than a threshold temperature (or a maximum temperature), determining that cool water is being delivered to the heating chamber 102 (e.g., as indicated by water flowing to the heating chamber), determining that hot water is being removed from the heating chamber (e.g., as indicated by water flowing from the heating chamber), or other inputs that can be used by the controller 130 to determine 204 whether a heat demand exists. In this way, the controller 130 can be configured to continually or regularly check for a heat demand signal.

If a heat demand exists, the method 200 can include heating 208 the water with the heat pump 120 (e.g., outputting a control signal to heat the water with the heat pump only). The method 200 can then include determining 210 if a heat demand has been satisfied. Determining 210 if a heat demand has been satisfied can occur immediately after heating 208 the water with the heat pump or can occur after a predetermined time has elapsed. Determining 210 if a heat demand has been satisfied can include, for example, receiving a stop signal from a user, determining that the water temperature is greater than the threshold water temperature, and/or determining that water is no longer flowing into or out of the water heater. If, however, the heat demand is satisfied, the method 200 can include outputting a control signal to cease heating 212 the water in the heating chamber 102 with the heat pump 120.

If the heat demand has not been satisfied by the heat pump 120, the method 200 can include determining 214 if the current supplied to the water heater system 100, as detected by the current sensor (e.g., current sensor 129), is greater than or equal to a threshold current. The threshold current, for example, can be a predetermined current that is less than or equal to the ampacity rating for the circuit supplying the electricity to the water heater system 100. For example, if the circuit supplying the electricity to the water heater system 100 has an ampacity rating of 15 amps, the threshold current can be between 12 amps +/−5% (e.g., between 11.4 amps and 12.6 amps). Similar current limitations can be applied to circuits having greater or lesser ampacity and can be based upon industry standards for circuit ampacity. The current can be a current delivered to the compressor 128 of the heat pump 120, or it can be a current delivered to the entire water heater system 100. As will be appreciated, by monitoring the current delivered to the compressor 128, the controller 130 can be configured to ensure the compressor 128 is operated within an acceptable range where the compressor 128 does not exceed the ampacity of the electrical circuit. In this way, the disclosed technology can incorporate a compressor 128 having a higher capacity than would normally be used for a given circuit because the controller 130 can help to ensure the compressor 128 does not draw an excessive current when operated.

If the current is less than the threshold current, the method 200 can include continuing 216 to heat the water in the heating chamber 102 with the heat pump. The method 200 can once again include receiving 204 the sensor data, determining 206 if a heat demand exists, heating 208 the water with the heat pump (e.g., continuing to heat the water with the heat pump), and determining 210 if the heat demand has been satisfied. If the heat demand has been satisfied, the method 200 can include outputting 212 a control signal to cease heating the water with the heat pump. If the heat demand has still not been satisfied, the method 200 can once again include determining 214 if the current is greater than or equal to the threshold current. In this way, the controller 130 can be configured to continually or regularly check the current delivered to the compressor 128 while a heat demand exists and ensure the current does not exceed the ampacity of the electrical circuit while the heat pump 120 is heating the water.

If the current is greater than or equal to the threshold current, the method 200 can include outputting 218 a control signal to begin heating the water in the heating chamber 102 with the electric heating element 112 and cease heating with the heat pump 120. As will be appreciated, the electric heating element 112 can be sized to ensure that the current used by the electric heating element 112 to heat the water does not exceed the ampacity rating of the electrical circuit. The method 200 can include continuing 220 to heat the water in the heating chamber with the electric heating element until the heat demand has been satisfied.

As will be appreciated, the method 200 just described can be used to operate the water heater system 100 by using the heat pump 120 while the compressor 128 is able to operate by drawing a current that is less than a threshold current and then switch to the electric heating element 112 when the compressor 128 is no longer able to operate by drawing a current that is less than the threshold current. In this way, the water heater system 100 can be configured to heat the water using the more efficient heat pump 120 until either the heat demand is satisfied or until the heat pump 120 is no longer able to operate by drawing a current that is below the threshold current. If the heat pump 120 is no longer able to operate without exceeding the threshold current, the heat pump 120 can be turned off, and the electric heating element 112 can be turned on. And while the electric heating element 112 is less energy efficient than the heat pump 120, the electric heating element 112 can continue to provide heat to the water without exceeding the threshold current. Although the method 200 is illustrated in FIG. 2 as ended following method step 220, the method 200 can include returning to start 202 the logic sequence by receiving a start signal or by initiating the method 300 (e.g., as power is received to the controller 130).

Figure 3:
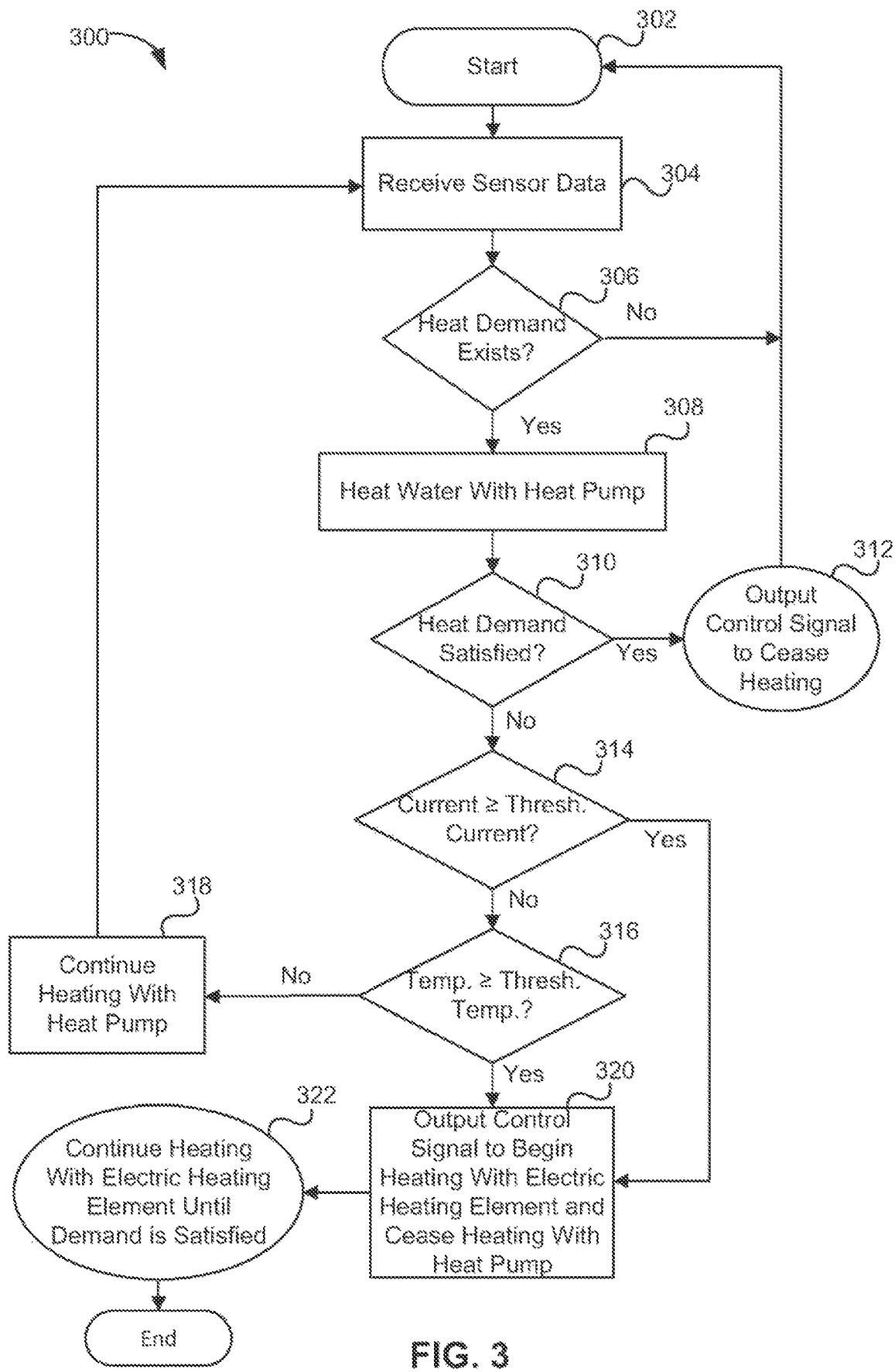
FIG. 3 is a logic diagram illustrating an example method of heating water using a heat pump and an electric heating element, in accordance with the disclosed technology.

FIG. 3 is a logic diagram illustrating another example method 300 of heating water using a heat pump 120 and an electric heating element 112, in accordance with the disclosed technology. Similar to the method 200, the method 300 of operating the water heater system 100 can include starting 302 a logic sequence by receiving a start signal or by initiating the method 300 (e.g., as power is received to the controller 130). The method 300 can include receiving 304 sensor data from various sensors in the water heater system 100. For example, the controller 130 can be configured to receive temperature data from the water temperature sensor 108 and the ambient temperature sensor 110 and current data from the current sensor 129. The method 300 can include determining 306 whether a heat demand exists (e.g., whether there is a need to heat the water in the heating chamber 102 to maintain the temperature of the water at a target set temperature). Determining whether a heat demand exists 306 can include receiving an input from a user, determining that the temperature of the water in the heating chamber 102 is less than a threshold temperature (or a maximum temperature), determining that cool water is being delivered to the heating chamber 102 (e.g., as indicated by water flowing to the heating chamber), determining that hot water is being removed from the heating chamber (e.g., as indicated by water flowing from the heating chamber), or other inputs that can be used by the controller 130 to determine whether a heat demand exists. If no heat demand exists, the method 300 can include starting 302 the method 300 again. In this way, the controller 130 can be configured to continually or regularly check for a heat demand signal and begin the method 300 when a heat demand exists.

If a heat demand exists, the method 300 can include heating 308 the water with the heat pump (e.g., outputting a control signal to begin heating the water in the heating chamber 102 with the heat pump 120 only). The method 300 can include determining 310 if a heat demand has been satisfied. Determining 210 if a heat demand has been satisfied can occur immediately after heating 208 the water with the heat pump or can occur after a predetermined time has elapsed. Determining 210 if a heat demand has been satisfied can include, for example, receiving a stop signal from a user, determining that the water temperature is greater than the threshold water temperature, and/or determining that water is no longer flowing into or out of the water heater. If, however, the heat demand is satisfied, the method 300 can include outputting a control signal to cease heating 312 the water in the heating chamber 102 with the heat pump 120.

If the heat demand has not been satisfied, the method 300 can include determining 314 if a current, as detected by the current sensor (e.g., current sensor 129), is greater than or equal to a threshold current. The current can be a current delivered to the compressor 128 of the heat pump 120 or it can be a current delivered to the entire water heater system 100. As mentioned above, by monitoring the current delivered to the compressor 128, the controller 130 can be configured to ensure the compressor 128 is operated within an acceptable range where the compressor 128 does not exceed the ampacity of the electrical circuit. In this way, the disclosed technology can incorporate a compressor 128 having a higher capacity than would normally be used for a given circuit because the controller 130 can help to ensure the compressor 128 does not draw an excessive current when operated.

If the current is less than the threshold current, the method 300 can include determining 316 if a temperature is greater than or equal to a threshold temperature. The temperature can include the temperature of the water in the heating chamber 102 as detected by, for example, the water temperature sensor 108. Alternatively or in addition, the temperature can be the temperature of the ambient air as detected by, for example, the ambient temperature sensor 110. Determining 316 if a temperature is greater than or equal to a threshold temperature can include determining whether multiple different temperatures are greater than or equal to respective threshold temperatures (e.g., evaluating both water temperature and ambient air temperature). Furthermore, the threshold temperature can be a setpoint temperature (which can be set by a user or be preprogrammed in the controller 130) of the water in the heating chamber 102 or the ambient air. The threshold temperature can be a temperature where, at temperatures greater than or equal to the threshold temperature, the heat pump 120 is unable or less likely to operate effectively (e.g., the heat pump 120 will be below a predetermined efficiency at or above the threshold temperature). In this way, the method 300 can determine, based on the water temperature data and/or the ambient air temperature data, whether to operate the heat pump 120 or the heating element 112.

If the temperature (e.g., the water temperature and/or the ambient air temperature) is less than the threshold temperature, the method 300 can include continuing 318 to heat the water with the heat pump 120. The method 300 can then include receiving 304 sensor data and once again performing the above described processes. In this way, the method 300 can continue to operate the heat pump 120 to heat the water until the heat demand is satisfied, the current exceeds the threshold current, or the temperature exceeds the threshold temperature.

If the current is greater than or equal to the threshold current or the temperature is greater than or equal to the threshold temperature, the method 300 can include outputting 320 one or more control signals to begin heating the water in the heating chamber 102 with the electric heating element 112 and cease heating with the heat pump 120. As will be appreciated, the electric heating element 112 can be sized to ensure that the current used by the electric heating element 112 to heat the water does not exceed the ampacity rating of the electrical circuit. The method 300 can include continuing 322 to heat the water in the heating chamber with the electric heating element 112 until the heat demand has been satisfied. Although the method 300 is illustrated in FIG. 3 as ended following method step 322, the method 300 can include returning to start 302 the logic sequence by receiving a start signal or by initiating the method 300 (e.g., as power is received to the controller 130).

As will be appreciated, the method 300 just described can be used to operate the water heater system 100 by using the heat pump 120 while the compressor 128 is able to operate by drawing a current that is less than a threshold current and/or the temperature (e.g., the water temperature and/or ambient air temperature) is less than the threshold temperature. If the current or temperature thresholds are exceeded, the water heater system 100 can be configured to heat the water using the electric heating element 112. In this way, the water heater system 100 can be configured to heat the water using the more efficient heat pump 120 until either the heat demand is satisfied or until the heat pump 120 is no longer able to operate by drawing a current that is below the threshold current or the temperature(s) is no longer below the threshold temperature.

Figure 4:
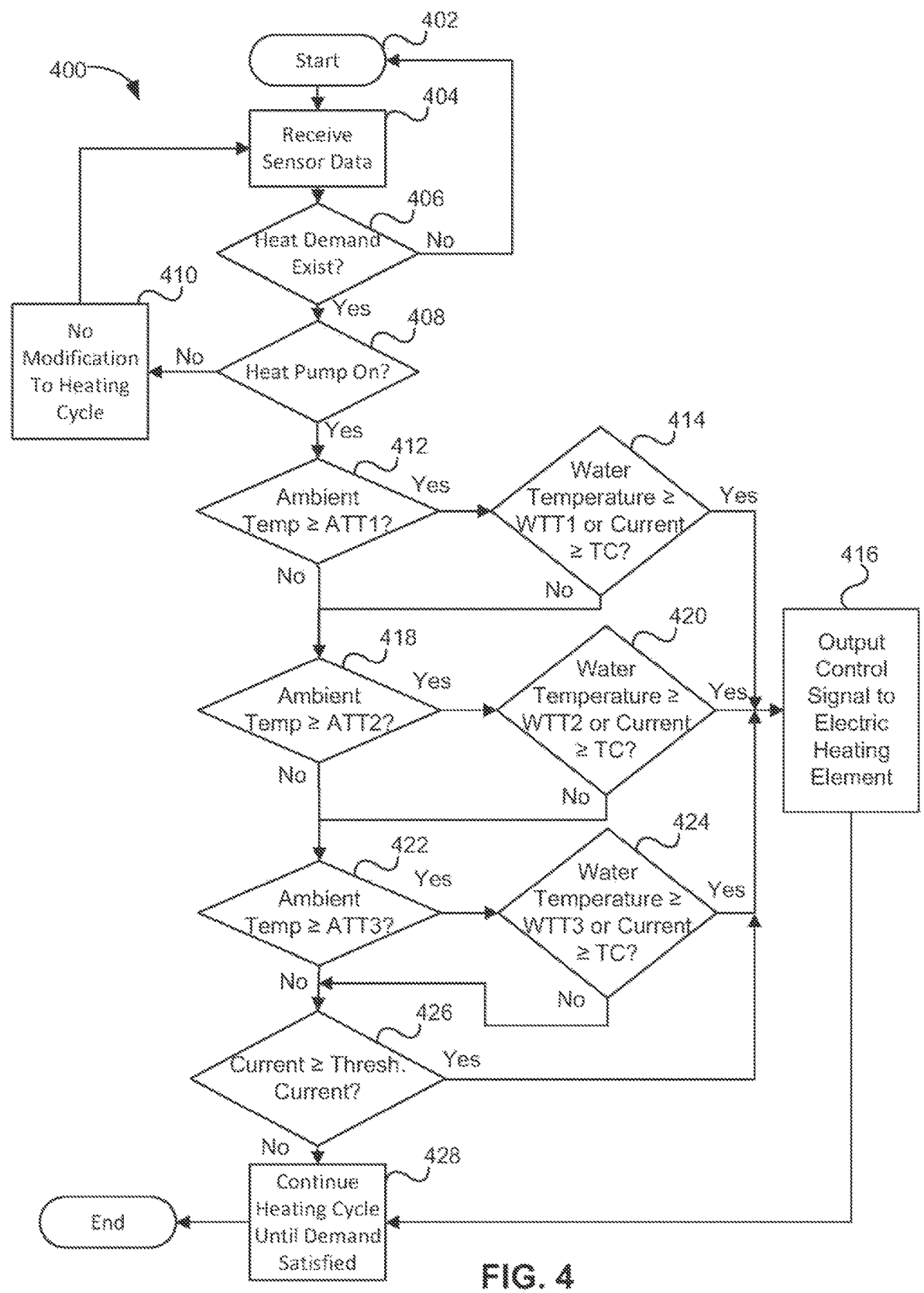
FIG. 4 is a logic diagram illustrating an example method of heating water using a heat pump and an electric heating element, in accordance with the disclosed technology.

FIG. 4 is a logic diagram illustrating an example method 400 of heating water using a heat pump 120 and an electric heating element 112, in accordance with the disclosed technology. The method 400 is offered as an example method of heating water using a heat pump (e.g., heat pump 120) and an electric heating element (e.g., electric heating element 112) where more than a single threshold temperature is used to operate the water heater system 100.

Similar to the methods 200 and 300, the method 400 of operating the water heater system 100 can include starting 402 a logic sequence by receiving a start signal or by initiating the method 400 (e.g., as power is received to the controller 130). The method 400 can include receiving 404 sensor data from various sensors in the water heater system 100. For example, the controller 130 can be configured to receive temperature data from the water temperature sensor 108 and/or the ambient temperature sensor 110 and/or current data from the current sensor 129. The method 400 can include determining 406 whether a heat demand exists (e.g., whether there is a need to heat the water in the heating chamber 102 to maintain the temperature of the water at a target set temperature). Determining whether a heat demand exists 406 can include receiving an input from a user, determining that the temperature of the water in the heating chamber 102 is less than a threshold temperature (or a maximum temperature), determining that cool water is being delivered to the heating chamber 102 (e.g., as indicated by water flowing to the heating chamber), determining that hot water is being removed from the heating chamber (e.g., as indicated by water flowing from the heating chamber), or other inputs that can be used by the controller 130 to determine whether a heat demand exists. If no heat demand exists, the method 400 can include starting 402 the method 400 again. In this way, the controller 130 can be configured to continually or regularly check for a heat demand signal and begin the method 400 when a heat demand exists.

The method 400 can include determining 408 whether the heat pump is currently operating (e.g., whether the compressor 128 of the heat pump 120 is on as indicated by a signal received from the compressor 128). If the heat pump is not currently operating, the method 400 can include continuing to operate the water heating system 100 as currently operating (e.g., with the electric heating element 112 if currently on).

If the compressor is on, the method 400 can be configured to operate the water heater system efficiently based on the ambient temperature and the water temperature. As will be appreciated by one of skill in the art, the efficiency of a heat pump can be negatively impacted as the ambient temperature rises. For example, some heat pump systems are unable to efficiently heat water to a temperature above 122° F. when the ambient temperature is greater than 130° F. Thus, operating the heat pump to effectively heat the water only as high as possible under the current ambient temperature conditions is desirable for increasing the overall efficiency of the water heater system. This can include heating the water to various water temperatures and via different components based on the current ambient temperature. For example, the method 400 can be configured to control the water heater system based on more than one ambient temperature threshold (e.g., 2, 3, 4, 5 or more ambient temperature thresholds) and more than one corresponding water temperature (e.g., 2, 3, 4, 5 or more water temperature thresholds). Each ambient temperature threshold can correspond to a maximum water temperature at which the heat pump can heat the water to while remaining efficient (e.g., maintaining at least a minimum efficiency of the heat pump and/or the overall water heater system). As a given ambient temperature threshold is reached or exceeded, the method 400 can include determining, based on a comparison of the water temperature to the water temperature threshold corresponding to the given ambient temperature threshold, if it is still efficient to operate the heat pump. Various examples of ambient temperatures and water temperatures are offered for explanatory purposes and are not intended to be limiting. For example, depending on the particular water heater configuration, the method 400 can be configured to control the water heater system based on different ambient temperatures and water temperatures than those described herein.

The method 400 can include determining 412 if the ambient temperature is greater than or equal to a first ambient threshold temperature ATT1. As an example, the first ambient threshold temperature ATT1 can be 130° F. If the ambient temperature is greater than or equal to the first ambient threshold temperature ATT1, the method 400 can include determining 414 if the water temperature (e.g., as detected by the water temperature sensor 108) is greater than or equal to a first water threshold temperature WTT1 or if the current in the electrical circuit is greater than or equal to a threshold current TC (e.g., as detected by the current sensor 129). As examples, the first water threshold temperature WTT1 can be 122° F., and the threshold current can be a predetermined current where the current drawn by the compressor is likely to exceed the recommended ampacity limit for the circuit (e.g., 12 amps for a 15 amp circuit, 15 amps for a 20 amp circuit, etc.).

If the water temperature is greater than or equal to the first water threshold temperature WTT1 or if the current in the electrical circuit is greater than or equal to the threshold current, the method 400 can include outputting 416 a control signal to begin heating the water with an electric heating element (e.g., electric heating element 112). If the ambient temperature is less than the first ambient threshold temperature ATT1, the water temperature is less than the first water threshold temperature WTT1, and the current is less than the threshold current, the method 400 can include determining 418 if the ambient temperature is greater than or equal to a second ambient threshold temperature ATT2. As an example, the second ambient threshold temperature ATT2 can be 120° F. If the ambient temperature is greater than or equal to the second ambient threshold temperature ATT2, the method 400 can include determining 420 if the water temperature is greater than or equal to a second water threshold temperature WTT2 or if the current in the electrical circuit is greater than or equal to the threshold current TC. As examples, the second water threshold temperature WTT2 can be 128° F. and the threshold current can be the same predetermined current previously described.

If the water temperature is greater than or equal to the second water threshold temperature WTT2 or if the current in the electrical circuit is greater than or equal to the threshold current, the method 400 can include outputting 416 a control signal to begin heating the water with an electric heating element (e.g., electric heating element 112). If the ambient temperature is less than the second ambient threshold temperature ATT2, the water temperature is less than the second water threshold temperature WTT2, and the current is less than the threshold current, the method 400 can include determining 422 if the ambient temperature is greater than or equal to a third ambient threshold temperature ATT3. As an example, the third ambient threshold temperature ATT3 can be 110° F. If the ambient temperature is greater than or equal to the third ambient threshold temperature ATT3, the method 400 can include determining 424 if the water temperature is greater than or equal to a third water threshold temperature WTT3 or if the current in the electrical circuit is greater than or equal to the threshold current TC. As examples, the third water threshold temperature WTT2 can be 132° F. and the threshold current can be the same predetermined current previously described.

If the water temperature is greater than or equal to the third water threshold temperature WTT3 or if the current in the electrical circuit is greater than or equal to the threshold current, the method 400 can include outputting 416 a control signal to begin heating the water with an electric heating element (e.g., electric heating element 112). If the ambient temperature is less than the third ambient threshold temperature ATT3, the method 400 can include determining 426 whether the current is greater than or equal to the threshold current. If the current is greater than or equal to the threshold current, the method 400 can include outputting 416 a control signal to heat the water with the electric heating element. If the current is less than the threshold current, the method 400 can include continuing 428 the heating cycle by heating the water with the heat pump until the heating demand is satisfied and the method 400 can be ended.

As previously described, because high ambient air temperature can negatively impact the performance of the heat pump 120 and because the heat pump 120 becomes less efficient to operate as the water temperature nears a maximum temperature of the water heater system 100, it can be desirable to operate the heat pump 120 below ambient temperature thresholds and below water temperature thresholds to increase the overall efficiency of the water heater system 100. For example, at higher ambient temperatures, the heat pump 120 will begin to operate less efficiently and may be unable to heat the water effectively to higher water temperatures than could otherwise be achieved if the ambient temperature were lower. Thus, when the ambient temperature is higher (e.g., greater than or equal to ATT1), the heat pump will be unable to efficiently heat the water to higher temperatures than it could if the ambient temperature were at a lower temperature (e.g., at or below ATT2). Because both the ambient temperature and the water temperature can negatively impact the performance of the heat pump 120, the method 400 can use the ambient temperature data and the water temperature data to efficiently operate the heat pump 120 and the electric heating element 112 to maximize the efficiency of the water heater system 100.

As will be appreciated, the methods 200, 300, and 400 just described can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method (e.g., method 200) and at least some elements or steps of a second method (e.g., method 300).

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A fluid heating device comprising:
a heating chamber configured to hold a fluid;
a heat pump configured to heat the fluid;
an electric heating element configured to heat the fluid;
a current sensor configured to detect a current; and
a controller configured to:
heat, based on the current being less than a threshold current, the fluid using the heat pump, and
heat, based on the current being greater than the threshold current, the fluid using the electric heating element.

2. The fluid heating device of claim 1, further comprising a temperature sensor configured to detect a temperature of the fluid.

3. The fluid heating device of claim 2, wherein the controller is further configured to:
heat, based on the temperature of the fluid being less than a threshold temperature and the current being less than the threshold current, the fluid using the heat pump, and
heat, based on the temperature of the fluid being less than the threshold temperature and the current being greater than the threshold current, the fluid using the electric heating element.

4. The fluid heating device of claim 3, wherein the threshold temperature is a first threshold temperature, the controller being further configured to:
heat, based on the temperature of the fluid being greater than a second threshold temperature and less than the first threshold temperature, the fluid with the electric heating element,
wherein the first threshold temperature is greater than the second threshold temperature.

5. The fluid heating device of claim 4, further comprising an ambient temperature sensor configured to detect an ambient temperature of ambient air proximate the fluid heating device, wherein the controller is further configured to:
heat, based on the ambient temperature being less than a threshold ambient temperature, the fluid using the heat pump.

6. The fluid heating device of claim 5, wherein the controller is further configured to:
heat, based on the ambient temperature being greater than or equal to the threshold ambient temperature, the fluid with the electric heating element.

7. The fluid heating device of claim 1, further comprising an ambient temperature sensor configured to detect an ambient temperature of ambient air proximate the fluid heating device, wherein the controller is further configured to:
heat, based on the ambient temperature being less than a threshold ambient temperature, the fluid using the heat pump.

8. The fluid heating device of claim 7, wherein the controller is further configured to:
heat, based on the ambient temperature being greater than or equal to the threshold ambient temperature, the fluid with the electric heating element.

9. A method for heating a fluid, the method comprising:
detecting a current using a current sensor; and
heating, based on the current being less than a threshold current, the fluid using a heat pump, or
heating, based on the current being greater than the threshold current, the fluid using an electric heating element.

10. The method of claim 9, further comprising detecting a temperature of the fluid using a temperature sensor.

11. The method of claim 10, further comprising:
heating, based on the temperature of the fluid being less than a threshold temperature and the current being less than the threshold current, the fluid using the heat pump, or
heating, based on the temperature of the fluid being less than the threshold temperature and the current being greater than the threshold current, the fluid using the electric heating element.

12. The method of claim 11, wherein the threshold temperature is a first threshold temperature, the method further comprising:
heating, based on the temperature of the fluid being greater than a second threshold temperature and less than the first threshold temperature, the fluid with the electric heating element,
wherein the first threshold temperature is greater than the second threshold temperature.

13. The method of claim 12, further comprising:
detecting an ambient temperature of ambient air proximate the fluid heating device using an ambient temperature sensor; and
heating, based on the ambient temperature being less than a threshold ambient temperature, the fluid using the heat pump.

14. The method of claim 13, further comprising heating, based on the ambient temperature being greater than or equal to the threshold ambient temperature, the fluid with the electric heating element.

15. The method of claim 9, further comprising:
detecting an ambient temperature of ambient air proximate the fluid heating device using an ambient temperature sensor; and
heating, based on the ambient temperature being less than a threshold ambient temperature, the fluid using the heat pump.

16. The method of claim 15, further comprising heating, based on the ambient temperature being greater than or equal to the threshold ambient temperature, the fluid with the electric heating element.

17. A method of controlling a water heater system comprising a heat pump and an electric heating element, the method comprising:
receiving, from a temperature sensor, a temperature of water in the water heater system;
receiving, from a current sensor, a current in the water heater system; and heating, based on the temperature of the water being less than a threshold temperature and the current being less than a threshold current, the fluid using the heat pump, or heating, based on the temperature of the water being less than the threshold temperature and the current being greater than the threshold current, the fluid using the electric heating element.

18. The method of claim 17, further comprising:

receiving, from an ambient temperature sensor, an ambient temperature of ambient air proximate the water heater system; and heating, based on the ambient temperature being less than a threshold ambient temperature, the fluid using the heat pump.

19. The method of claim 18, further comprising heating, based on the ambient temperature being greater than or equal to the threshold ambient temperature, the fluid with the electric heating element.

\* \* \* \* \*